US006385068B2

(12) United States Patent
Aenderkerk et al.

(10) Patent No.: US 6,385,068 B2
(45) Date of Patent: May 7, 2002

(54) CIRCUIT DEVICE

(75) Inventors: Everaard Marie Jozef Aenderkerk; Wilhelmus Hinderikus Maria Langeslag; Geert Willem Van der Veen, all of Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/883,429

(22) Filed: Jun. 18, 2001

(30) Foreign Application Priority Data

Jun. 20, 2000 (EP) .......................................... 00202146

(51) Int. Cl.$^{7}$ .......................................... H02M 7/5387

(52) U.S. Cl. .......................................... 363/132; 315/307

(58) Field of Search .......................... 363/16, 17, 98, 363/131, 132; 323/905; 315/119, 307, 310, DIG. 4, DIG. 7

(56) References Cited

U.S. PATENT DOCUMENTS 5,500,792 A * 3/1996 Jeon et al. .................... 363/98
5,781,418 A * 7/1998 Chang et al. ................. 363/16
6,144,568 A * 11/2000 Franck et al. ........... 363/132 X

* cited by examiner

*Primary Examiner*—Jessica Han

(57) ABSTRACT

A lamp is operated using a DC-AC converter provided with switches and a control circuit for controlling the switches and generating a high-frequency AC lamp current. In each half period of the control signal generated by the control circuit, each of the switching elements is rendered conductive during successive time intervals. The lamp can be dimmed without instabilities by adjusting the second time interval in each half period of the control signal.

5 Claims, 2 Drawing Sheets

CIRCUIT DEVICE

Figure 1:
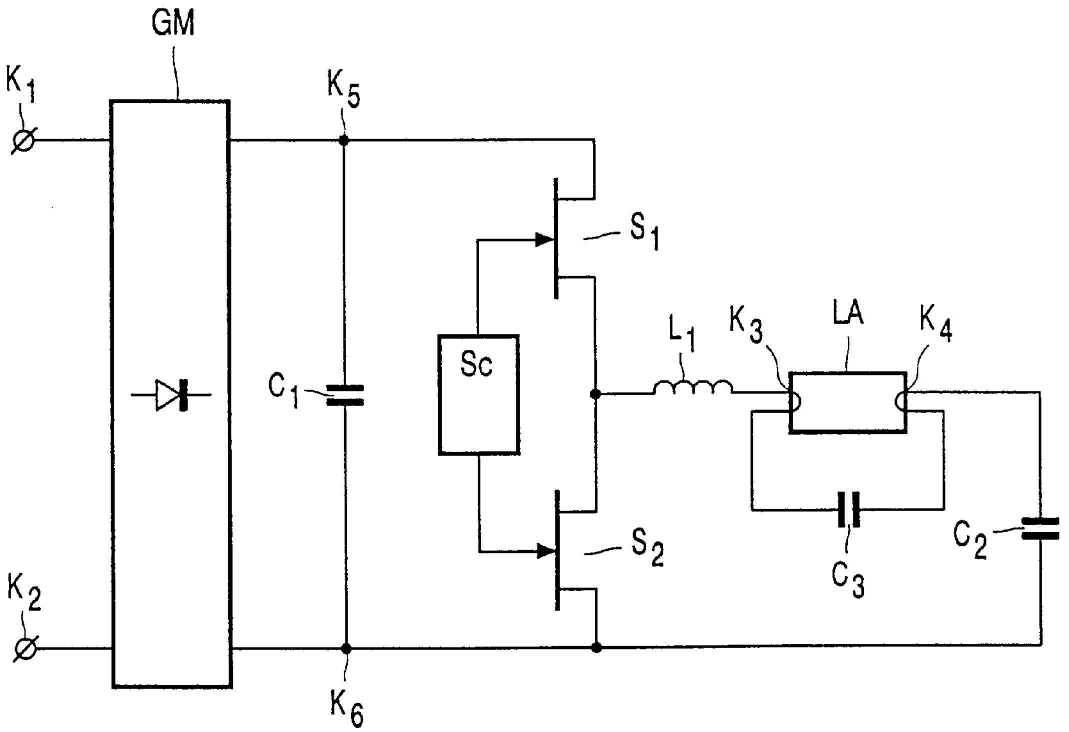

The invention relates to a circuit device for supplying an alternating current of frequency f to a lamp, which circuit device is provided with a DC-AC converter comprising

- input terminals for connecting the circuit device to a supply voltage source supplying a DC voltage,
- a first branch including a series arrangement of a first switching element and a second switching element,
- a control circuit coupled to respective control electrodes of the switching elements for rendering the switching elements conducting and non-conducting,
- a load branch shunting one of the switching elements and provided with a series arrangement of an inductive element and terminals for accommodating the lamp.

Such a circuit device is disclosed in EP 0323676. In such a circuit device, the power consumed by the lamp can be adjusted, for example, by adjusting the frequency f of the control signal. A drawback of this way of adjusting the power consumed by the lamp resides in that the connection between the frequency of the control signal and the power consumed by the lamp is not unambiguous throughout the range of power consumed by the lamp. Particularly in the case of a comparatively low power consumption by the lamp, this may give rise to instabilities in the lamp operation. Another possibility of adjusting the power consumed by the lamp is to adjust the periods during which the switching elements are conducting in each period of the control signal, while the frequency of the control signal remains constant. This can be carried out symmetrically, which means that each one of the switching elements is conducting during an equal period of time in each period of the control signal. However, this can also be carried out asymmetrically, which means that the time interval during which the first switching element is conducting is unequal, in each period of the control signal, to the time interval during which the second switching element is conducting. In addition, a distinction can be made between a situation wherein one of the switching elements is conducting at any instant in a period of the control signal and a situation wherein there are time intervals during which neither switching element is conducting. In practice it has been found that asymmetrically driving the switching elements gives rise, for certain unpredictable values of power consumed by the lamp, to instabilities in the lamp. If the switching elements are symmetrically driven, a reduction of the duration during which each of the switching elements is conducting in a period of the control signal means that, during each period of the control signal, there are time intervals wherein both switching elements are non-conducting. It has been found that this way of driving the switching elements also gives rise to instabilities in the lamp, however, the values of power consumed by the lamp are predictable.

It is an object of the invention to provide a circuit device by means of which the power consumed by the lamp can be adjusted in a comparatively large range without instabilities developing in the lamp.

To achieve this, a circuit device as mentioned in the opening paragraph is characterized in accordance with the invention in that the control circuit generates a control signal at a frequency f during operation of the lamp,

- for successively rendering the first switching element conducting during a first time interval and the second element during a second time interval in each first half period of the control signal, each one of the switching elements being non-conducting during the remaining part of the first half period of the control signal, and

- for successively rendering the second switching element conducting during a third time interval and the first switching element during a fourth time interval in each second half period of the control signal, each one of the switching elements being non-conducting during the remaining part of the second half period of the control signal, and
- in that the control signal is additionally provided with a dimming circuit for setting the duration of at least one of the two time intervals during each half period of the control signal wherein one of the switching elements is conducting. It is possible, for example, that the dimming circuit is provided with means for setting the durations of the first and the third time interval. In a preferred embodiment of a circuit device in accordance with the invention, the dimming circuit is provided with means for setting the durations of the second and the fourth time interval. It has been found that this preferred embodiment enables the power of the lamp to be adjusted in a very large range without instabilities.

During operation of a circuit device in accordance with the invention, the control signal renders the switching elements conducting and non-conducting. As a result, an alternating current of frequency f flows in the load branch. If, for example, the durations of the second and the fourth time interval can be set by means of the dimming circuit, and are set such that the difference between the durations of the first and the second time interval is maximal and the difference between the durations of the third and the fourth time interval are also maximal, then the power consumed by the lamp is maximal. At settings of the durations of the second and the fourth time interval at which these differences are smaller, also the power consumed by the lamp is smaller. It is thus possible, for example by setting the duration of the second and the fourth time interval, to adjust the power consumption by the lamp and hence the luminous flux of the lamp in a comparatively large range. It has been found that, within this range, no instabilities occur in the lamp.

Satisfactory results have been achieved with embodiments of a circuit device in accordance with the invention, wherein the duration of the second time interval is equal to the duration of the fourth time interval.

Satisfactory results have also been achieved with embodiments of a circuit device in accordance with the invention, wherein the duration of the first time interval is equal to the duration of the third time interval.

A circuit device in accordance with the invention can be embodied such that the second and the fourth time interval can be adjusted in a range from 0 to $\frac{1}{2}T-\Delta t1$ and in a range from 0 to $\frac{1}{2}T-\Delta t3$, respectively, wherein T is the duration of a period of the control signal, and $\Delta t1$ and $\Delta t3$ are the durations of the first and the third time interval. In this case, the power consumed by the lamp increases as the durations of the second and the fourth time interval increase.

These and other aspects of the invention will be apparent from and elucidated with reference to the embodiment(s) described hereinafter.

Figure 2A:
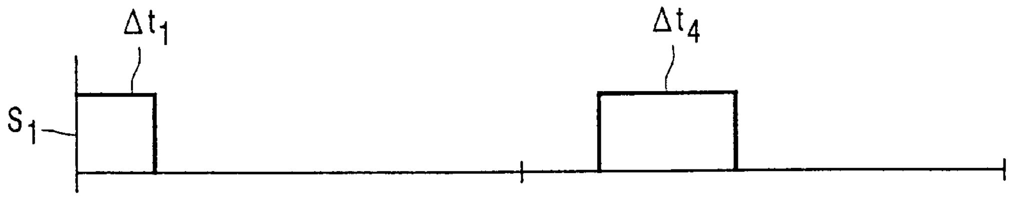
Figure 2B:
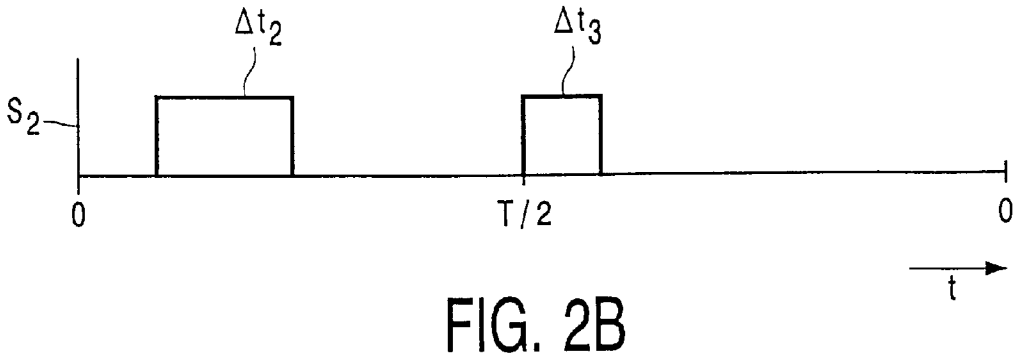

In the drawings:

FIG. 1 diagrammatically shows an example of a circuit device in accordance with the invention;

FIG. 2 shows the form of the control signal generated by a control circuit forming part of the circuit device shown in FIG. 1, and FIG. 3 shows the form of a current and two voltages in the circuit device shown in FIG. 1 during lamp operation, if the switching elements are driven by a control signal the form of which is comparable to that indicated in FIG. 2.

In FIG. 1, K1 and K2 are terminals which are to be connected to a supply voltage source supplying a low-frequency AC voltage. Terminals K1 and K2 are connected to respective inputs of rectifier means GM, which are formed by a diode bridge. Respective outputs of the rectifier means GM are connected to input terminals K5 and K6 which are to be connected to a supply voltage source supplying a DC voltage. Input terminals K5 and K6 are connected to each other by means of a capacitor C1, which is a buffer capacitor. The supply voltage source supplying a DC voltage is formed, in this example, by the supply voltage source supplying an AC voltage, terminals K1 and K2, rectifier means GM and capacitor C1. Capacitor C1 is shunted by a series arrangement of a first switching element S1 and a second switching element S2. In this example, the series arrangement forms a first branch. Sc is a control circuit for generating a control signal at a frequency f for rendering the switching elements conducting and non-conducting. Respective outputs of control circuit Sc are connected to respective control electrodes of the switching elements. Switching element S2 is shunted by a load branch, which is formed by a series arrangement of coil L, terminal K3, capacitor C3, terminal K4 and capacitor C2. Terminals K3 and K4 form terminals for accommodating a lamp. A lamp La is connected to these terminals. In this example, coil L forms an inductive element.

The operation of the example shown in FIG. 1 is as follows.

If terminals K1 and K2 are connected to the poles of a supply voltage source supplying a low-frequency AC voltage, then this low-frequency AC voltage is rectified by the rectifier means GM, and a DC voltage is applied across capacitor C1 and hence also between input terminals K5 and K6. The control circuit Sc generates a control signal at a frequency f for rendering each of the switching elements alternately conducting and nonconducting.

FIG. 2 shows the control signal for the two switching elements S1 and S2. The duration of a period of the control signal is T. The Figure shows that at the beginning of each first half period, the first switching element is rendered conducting during a constant first time interval $\Delta t1$. At a later stage in the first half period of the control signal, the second switching element S2 is rendered conducting during a second time interval $\Delta t2$. The duration of the time interval $\Delta t2$ is adjustable in a range between 0 and $\frac{1}{2}T-\Delta t1$. At the beginning of each second half period of the control signal, the second switching element S2 is rendered conducting during a constant third time interval $\Delta t3$. $\Delta t3$ is chosen so as to be equal to $\Delta t1$. At a later stage in the second half period of the control signal, the first switching element S1 is rendered conducting during a fourth time interval $\Delta t4$. The duration of the time interval $\Delta t4$ is adjustable in a range between 0 and $\frac{1}{2}T-\Delta t3$. Frequently, the duration of the second time interval in the entire adjustable range exceeds the duration of the first time interval, and the duration of the fourth time interval in the entire adjustable range exceeds the duration of the third time interval. The average power consumption of the lamp during the first half period of the current through the lamp is determined by the difference in duration between the first and the second time interval. The average power consumption of the lamp during the first half period of the current through the lamp is minimal if the difference between the duration of the second time interval and the duration of the first time interval is minimal. Correspondingly, the average power consumption of the lamp during the second half period of the current through the lamp is determined by the difference in duration between the third and the fourth time interval. The average power consumption during the second half period of the current through the lamp is minimal if the difference between the duration of the fourth time interval and the duration of the third time interval is minimal.

Figure 3A:
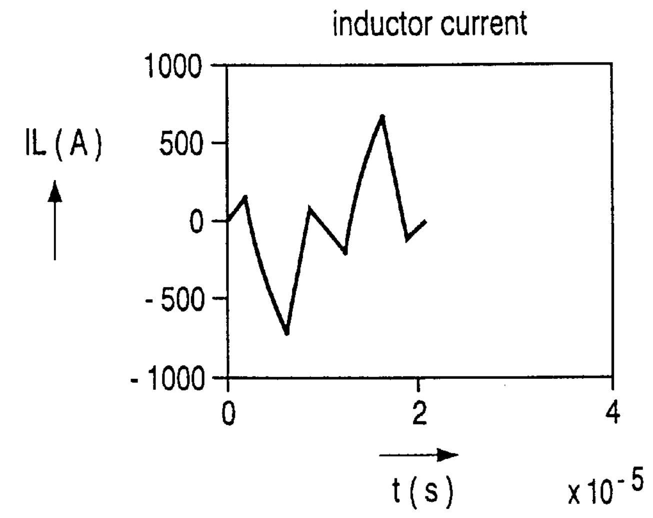
Figure 3B:
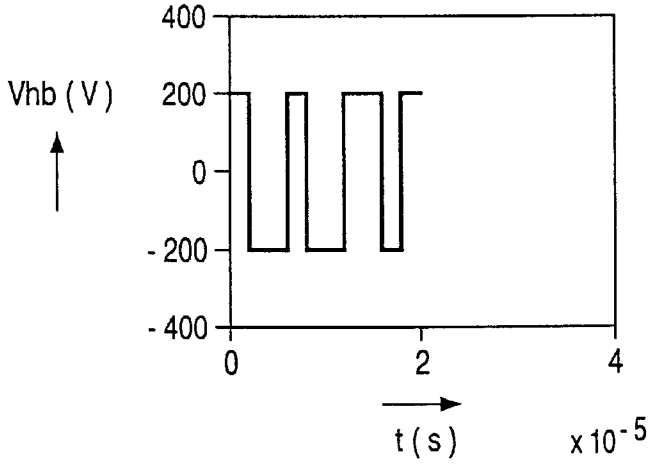
Figure 3C:
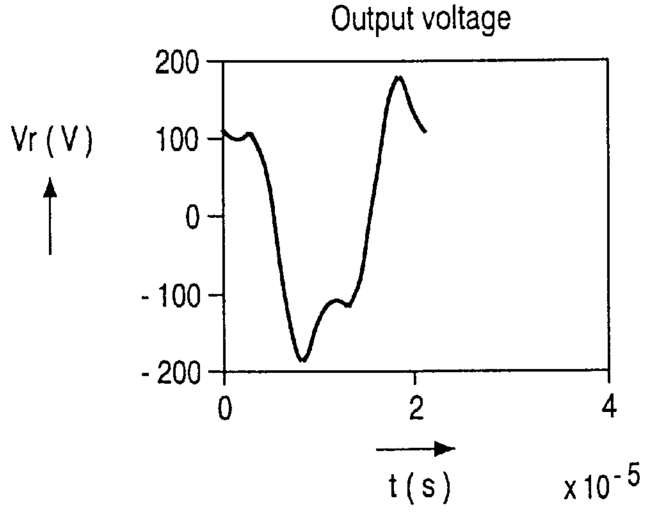

FIG. 3(A) shows a period of the current through coil L1 in the circuit device shown in FIG. 1. The Figure shows that this current changes sign six times in each period. FIG. 3(B) shows a period of the voltage at a junction point of both switches. This voltage too changes sign six times during each period. FIG. 3(C) shows a period of the voltage across the lamp La.

A concrete embodiment of a circuit device as shown in FIG. 1 was used to feed a TL-type low-pressure mercury vapor discharge lamp having a rated power of 35 watts. The frequency f of the control signal, and hence of the lamp current, was 54 kHz. The first and the third time interval were chosen to be equal to 10% of a period of the control signal. It proved possible to achieve a reduction of the power consumed by the lamp from 35 watts to 1 watt by reducing the duration of the second and the fourth time interval from 25% to 17% of the duration of a period of the control signal. During this reduction of the power consumed by the lamp, no instabilities occurred in the lamp.

What is claimed is:

1. A circuit device for supplying an alternating current of frequency f to a lamp, which circuit device is provided with a DC-AC converter comprising input terminals for connecting the circuit device to a supply voltage source supplying a DC voltage, a first branch including a series arrangement of a first switching element and a second switching element, a control circuit coupled to respective control electrodes of the switching elements for rendering the switching elements conducting and non-conducting, a load branch shunting one of the switching elements and provided with a series arrangement of an inductive element and terminals for accommodating the lamp, characterized in that the control circuit generates a control signal at a frequency f during operation of the lamp, for successively rendering the first switching element conducting during a first time interval and the second switching element during a second time interval in each first half period of the control signal, each one of the switching elements being non-conducting during the remaining part of the first half period of the control signal, and for successively rendering the second element conducting during a third time interval and the first switching element during a fourth time interval in each second half period of the control signal, each one of the switching elements being non-conducting during the remaining part of the second half period of the control signal, and in that the control signal is additionally provided with a dimming circuit for setting the duration of at least one of the two time intervals during each half period of the control signal wherein one of the switching elements is conducting.

2. A circuit device as claimed in claim 1, wherein the dimming circuit is provided with means for setting the durations of the second and the fourth time interval.

3. A circuit device as claimed in claim 2, wherein the second and the fourth time interval are adjustable in a range from 0 to $\frac{1}{2}T-\Delta t1$ and in a range from 0 to $\frac{1}{2}T-\Delta t3$, respectively, wherein T is the duration of a period of the control signal, and Δt1 and Δt3 are the durations of the first and the third time interval.

4. A circuit device as claimed in claim 1, wherein the duration of the first time interval is equal to the duration of the third time interval.

5. A circuit device as claimed in claim 1, wherein the duration of the second time interval is equal to the duration of the fourth time interval.

* * * * *